United States Patent Office 3,485,282
Patented Dec. 23, 1969

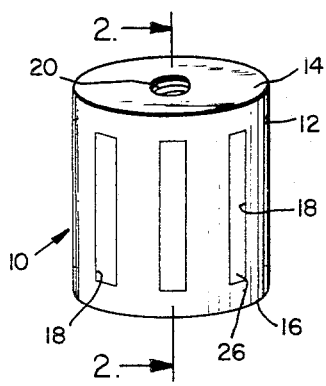
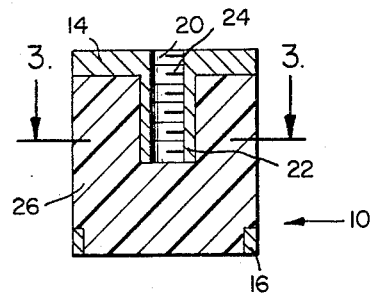
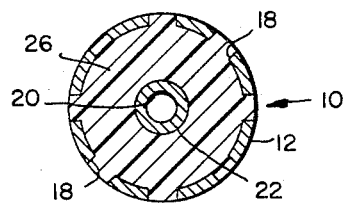
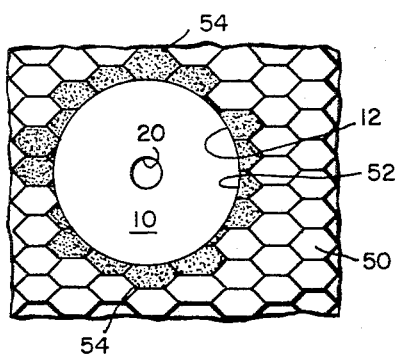
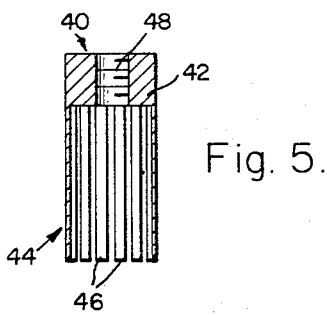
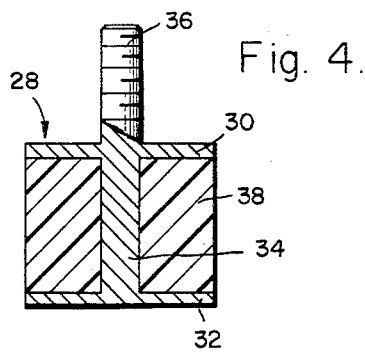
Gordon R. Lopez,
Mark M. Frisman,
INVENTORS.

3,485,282
EXPANDABLE INSERT FOR SOLID AND CELLULAR STRUCTURES
Gordon R. Lopez and Mark M. Frisman, Torrance, Calif., assignors to Hughes Aircraft Company, Culver City, Calif., a corporation of Delaware
Filed Jan. 26, 1968, Ser. No. 700,950
Int. Cl. F16b 39/00; E04b 2/28; B23p 11/02
U.S. Cl. 151—41.7                     8 Claims

ABSTRACT OF THE DISCLOSURE

An insert for cellular and solid structures, having a self-contained bonding means for attachment of the insert to the structure. The bonding means may comprise a plastic containing a blowing agent, such that upon the application of heat or a catalyst, the bonding means expands from the insert into contact with the structure.

---

The present invention relates to an insert for cellular and solid structures and, more particularly, to such an insert having self contained bonding means for attachment of the insert to the structure.

Cellular structures, such as the well-known honeycomb construction, have a great variety of uses where a strong, lightweight panel is needed, such as in aircraft components, in space vehicles, and in any structure where low weight is necessary or desirable. Such structures comprise a pair of thin sheet skins bonded to an inner cellular core. The core is so bent or shaped as to form corrugations or hexagonal or other open shapes, and may be either foam-filled or empty.

Such cellular structures are admirably suited to their purpose; however, it is many times necessary to affix attachments thereto, such as brackets, screws and nuts. Because of the cellular core, it is not possible to easily affix such attachments to the structure because the core does not have sufficient strength to provide an adequate support or bond for the attachments which, consequently, generally tear away from the structure or enlarged the opening under vibration or stress. The structure is weakened and the attachments become separated or loosened therefrom.

Many techniques, and devices have been utilized to overcome these problems, such devices including inserts spaced between the skins, bushings, special molding materials, as epoxy resins which are injected into the cellular structure and about a pre-inserted fastener, and the like. However, many of these prior devices are relatively expensive, for example, with respect to the labor and time and special tooling required. A bushing, for example, requires multiple operations and multiple parts. A hole is cut into the honeycomb panel. The bushing is placed within the hole and is bonded therein. Finally, the insert is affixed to the bushing and to the panel. Injection of bonding materials require special injection machinery. Regardless of the technique, a hole must first be formed in the cellular structure for reception of the insert. A bonding agent is applied between the bushing or insert and the cells and skins. When bonding agents are injected into the cellular structure and about the insert, the bonding agent will fill the adjoining cells which have been ruptured and opened by means of the hole placed in the structure. The volume of these open cells varies from the volume of other cells opened by other holes, thus requiring a greater or lesser amount of bonding agent to be injected therein. Such varying amounts of injected bonding agent result in a weight imbalance about the insert and from insert to insert. In many cases, even a minute imbalance is not permissible and may cause grave problems in the functioning of the vehicle in which the panel is used.

Solid structures, such as wood, metal, wall board, also present problems as to the attachment of fixtures thereto. For example, it may be desired to place a threaded insert into such solid structures, yet the proper tapping tools may not be available. Plaster wall boards or wood may not provide sufficient strength to retain inserts, especially when such structures are subject to vibration. Wall boards are particularly deficient in their ability to retain inserts and, for this reason, special mechanical connectors, such as spreading bolts of the toggle and the metal spreading variety, have been devised. Such special connectors are relatively expensive and require an enlarged hole in the structure which may produce deleterious side-effects.

The present invention overcomes these and other problems by providing an insert containing a specifically or precisely measured specific amount of expandable bonding agent. In general, the insert comprises a receptacle containing an expandable bonding agent.

In one embodiment, the receptacle comprises a cylindrical casing having a plurality of apertures spaced about its periphery. An attachment, such as a floating or fixed nut or bolt, is secured centrally within the casing. An expandable bonding agent, such as a plastic, is contained within the casing. The insert is placed within a preformed hole in the cellular or solid structure. A catalyzing agent, such as heat, is then applied to the insert and to the expandable bonding agent which then expands through the apertures in the casing and extrudes into the cells opened by the hole in the case of a cellular structure. The bonding means expands until it fills completely all the ruptured cells. If a similar or equal amount of expandable bonding material is placed within every insert, every installed insert will have the same weight and no imbalance will result in the entire vehicle. In addition, such inserts facilitate the design of such vehicles. In solid structures, the bonding material volumetrically expands to the extent of the walls of the hole to form a solid, locked bond.

In another embodiment, the expandable bonding agent is held between a pair of spaced upper and lower walls which forms the receptacle. In a further embodiment, the receptacle comprises an upper wall from which an open-ended apertured wall extends.

It is, therefore, an object of the present invention to provide an insert for structural elements having a reliable high strength bonding feature.

Another object is the provision of such an insert which is easily installable within cellular and solid structures.

Another object is to provide an insert which, when installed in a cellular structure, will have the same weight as every other similar insert so installed.

Other aims and objects, as well as a more complete understanding of the present invention, will appear from the following explanation of exemplary embodiments and the accompanying drawings thereof, in which:

FIG. 1 is a perspective view of a typical insert;
FIG. 2 is a sectional view of the insert taken along lines 2—2 of FIG. 1;
FIG. 3 is a sectional view of the insert taken along lines 3—3 of FIG. 2;
FIG. 4 is a sectional view of another embodiment of the invention;
FIG. 5 is a perspective view of a receptacle for a third embodiment of the invention; and
FIG. 6 is a top view of the insert as affixed within a honeycomb cellular structure with a portion of one skin of the structure removed.

Accordingly with reference to FIGS. 1–3, an insert 10 comprises a receptacle disposed as a cylindrical casing 12 having an upper end 14 and an open lower end 16. If desired, however, end 16 may be closed. A plurality of apertures 18 is placed within the periphery of the casing thereby providing a connection between the ends and an opening. A bore 20 is provided centrally within the casing and comprises a cylindrical wall 22. Wall 22 may be separately manufactured and affixed to the casing and end 14 or may be manufactured integrally therewith. As depicted, bore 20 is provided with threads 24 for reception of a bolt; however, a bolt or other attachment means may be secured to the casing and end portion 14 in order to provide a central solid core as indicated in FIG. 4. In such a case, the male fastener will extend above end portion 14.

An expandable material 26 is placed within the hollowed out casing and may comprise a plastic having a foaming or expanding agent which may expand to a volume greater than that of casing 12 under a variety of conditions such as by application of heat. Such plastics include, but are not limited to an epoxy adhesive having a suitable blowing agent such as diaminodiphenylsulfane, N-nitrosobeta-aminoketone, substituted diazoacetic acid ester, carboxylic pyrazoline ester and other similar compounds as set forth in "Rigid Plastic Foams" by T. H. Ferrigno, Reinhold Publishing Co., New York, 1963. Other such plastics include polyurethanes having a suitable blowing agent such as ammonium carbonate, tolylene diisocyanate, and those listed above and plasticized polyvinylchloride with a blowing agent of a solvent type. One such epoxy adhesive having a suitable blowing agent is identified as "FM 40" trademark of the American Cyanamid Company. The particular plastic with blowing agent is selected according to the particular needs of the end product. The bonding agent is adapted to expand, such as by application of heat or by some catalyzing agent, and is of such viscosity that it may extrude through holes or apertures 18.

A modification of the invention is depcited in FIG. 4 as an insert 28 comprising a pair of end plates 30 and 32 joined by a connecting center shank 34, the end plates forming a receptacle. A threaded portion 36 extends from plate 30 for reception of a bracket or nut. The plates, shank and threaded portion may be manufactured as a unit or be fastened together as by welding. An expandable bonding agent 38 is held between plates 30 and 32 and is formed about shank 34. Agent 38, in this embodiment, has sufficient density as to be self-supporting.

Referring to FIG. 5, a third embodiment of the present invention comprises an insert 40 having an end portion 42 and a depending receptacle 44 comprising a plurality of tines 46 secured to end portion 42. A threaded hole 48 is formed in the end portion for reception of a bolt. In this embodiment, an expandable bonding agent has been omitted from the drawing solely for illustrative purposes in order to clearly depict the receptacle and the end portion. It is to be understood that an expandable bonding agent is contained within receptacle 44 prior to use of insert 40.

A method for securing the inserts of FIGS. 1–5 to a cellular structure 50 is described below with reference to the drawing of FIG. 6. A hole 52 is cut within structure 50 and is so sized that insert 10, 28, or 40 may be placed therein. Heat or some other catalyzing agent is then applied to the insert so that the bonding agent expands and fills surrounding cells 54 which have been ruptured when the hole was cut within the structure. The bonding agent expands to the extent of the ruptured cells and then is permitted to solidify to securely attach the insert within structure 50. Although the volume of the ruptured cell and the density of the expanded agent will vary from the installation to installation, the weight of the material expanded into the ruptured cells remains the same.

Although the invention has been described with reference to particular embodiments thereof, it should be realized that various changes and modifications may be made therein.

What is claimed is:

1. An insert comprising a receptacle having at least a single end member and means defining a hollow chamber, a measured amount by weight of a volumetrically expandable bonding material contained within said chamber, and attachment means secured to said end member.

2. An insert as in claim 1 wherein said bonding material comprises a heat expandable plastic.

3. An insert as in claim 1 wherein said receptacle comprises an apertured casing.

4. An insert as in claim 3 wherein said receptacle comprises a cylindrical shell having peripheral openings to permit flow of said bonding material upon expansion thereof into bonding engagement with a structure to which the insert is to be affixed.

5. An insert as in claim 1 wherein said receptacle comprises a pair of plates having connection means secured therebetween.

6. An insert as in claim 5 wherein said connection means comprises a cylindrical shell having peripheral apertures therein and substantially encompassing said bonding agent.

7. An insert as in claim 5 wherein said connection means comprises a central shank encompassed by said bonding agent.

8. A structure having a plurality of inserts placed within opening means in said structure; each said insert comprising a receptacle having at least a single end member and means defining a hollow chamber, a measured amount by weight of a volumetricaly expandable bonding material contained within said chamber, and attachment means secured to said end member; and said material of each of said inserts bonding said inserts to said structure at said opening means.

References Cited

UNITED STATES PATENTS

| 1,487,290 | 3/1924 | Tomkinson | 85—66 |
| 2,092,341 | 9/1937 | De Vries | 85—66 |
| 2,445,172 | 7/1948 | Gravinese et al. | 151—14.5 |
| 2,718,485 | 9/1955 | Samuely | 151—41.7 |
| 2,870,760 | 1/1959 | Michaud | 29—447 |
| 2,889,733 | 6/1959 | Vanderhoof | 29—447 |
| 2,992,457 | 7/1961 | Harrison | 29—447 |
| 2,994,933 | 8/1961 | Wolfe | 85—37 |
| 3,093,526 | 6/1963 | Price et al. | 264—249 |
| 3,322,446 | 5/1967 | Koziol et al. | 151—14.5 |

FOREIGN PATENTS

| 215,500 | 6/1958 | Australia. |
| 812,540 | 4/1959 | Great Britain. |
| 902,147 | 7/1962 | Great Britain. |

MARION PARSONS, Jr., Primary Examiner

U.S. Cl. X.R.

29—447; 52—617; 85—63; 264—249